(12) United States Patent
Russ

(10) Patent No.: US 6,874,059 B1
(45) Date of Patent: Mar. 29, 2005

(54) SYSTEM AND METHOD FOR USING ANONYMOUS TOKENS FOR EFFICIENT MEMORY MANAGEMENT

(75) Inventor: Craig Russ, Berwyn, PA (US)

(73) Assignee: Unisys Corporation, Blue Bell, PA (US)

( * ) Notice: Subject to any disclaimer, the term of this patent is extended or adjusted under 35 U.S.C. 154(b) by 569 days.

(21) Appl. No.: 09/992,828

(22) Filed: Nov. 14, 2001

(51) Int. Cl.[7] .............................................. G06F 12/00
(52) U.S. Cl. ...................... 711/111; 711/100; 711/154; 707/205; 707/206; 707/200; 707/100
(58) Field of Search ................................ 711/111, 100, 711/154; 707/205, 206, 200, 100, 103 R

(56) References Cited

U.S. PATENT DOCUMENTS 5,963,945 A * 10/1999 Pal ............................... 707/10

6,343,296 B1 * 1/2002 Lakhamraju et al. ... 707/103 R

* cited by examiner

*Primary Examiner*—Kimberly McLean-Mayo
(74) *Attorney, Agent, or Firm*—Lise A. Rode; Mark T. Starr; Woodcock Washburn LLP

(57) ABSTRACT

A mechanism for managing pointers or handles to transient objects is disclosed. An anonymous token is assigned to an object. When an anonymous token is needed for an object, an unused token value is obtained from a list of available values and is associated with the object, the token value is removed from the list of available values, and data elements of a token data array entry associated with the anonymous token value are updated. When an operation is performed on an object identified by an anonymous token, data elements are evaluated and if reuse counts are not identical or if the validity indicator does not indicate that the object is valid, the operation is not performed. When an object is de-allocated, the token value associated with the object is returned to the available list and the data elements associated with the token value are updated.

21 Claims, 7 Drawing Sheets

INTEGER PROCEDURE GET_TOKEN(REFERENCE TO OBJECT, REFERENCE TO TOKEN);

```
    TOKENINXV := TOKEN_GETTOKEN;
      % TOKEN_GETTOKEN is a procedure which obtains an available slot
      % in the token data array.
401   % TOKEN_RETURNTOKEN is the complementary procedure. It returns a
      % slot in the token data array to the available list.
    IF TOKENINXV EQL 0 THEN
    BEGIN
402    % No slot available
       GET_TOKENV := TOKEN_RESOURCELIMIT;
    END ELSE
    BEGIN
403    LOCK(TOKEN_DATA[TOKENINXV].LOCK);
       IF OBJECT.TOKENINX NEQ 0 THEN
       BEGIN
404       GET_TOKENV := TOKEN_ALREADYDONE;
          EXISTING_TOKENINXV := OBJECT.TOKENINX;
       END ELSE
       BEGIN
          TOKEN_DATA[TOKENINXV].REUSE_COUNT :=
            TOKEN_DATA[TOKENINXV].REUSE_COUNT+1;
          TOKEN_DATA[TOKENINXV].OBJECT_REFERENCE :=
            REFERENCE TO OBJECT;
405       TOKEN_DATA[TOKENINXV].VALID := TRUE;
          TOKENV.TOKEN_REUSECOUNTF :=
            TOKEN_DATA[TOKENINXV].REUSE_COUNT;
          TOKENV.TOKEN_INXF := TOKENINXV;
          OBJECT.TOKENINX := TOKENINXV;
          GET_TOKENV := TOKEN_SUCCESS;
       END;
406    UNLOCK(TOKEN_DATA[TOKENINXV].LOCK);
       IF GET_TOKENV EQL TOKEN_SUCCESS THEN
407    BEGIN
          TOKEN := TOKENV;
       END ELSE
       IF GET_TOKENV EQL TOKEN_ALREADYDONE THEN
       BEGIN
          LOCK(TOKEN_DATA[EXISTING_TOKENINXV].LOCK);
          IF TOKEN_DATA[EXISTING_TOKENINXV].VALID AND
408         (TOKEN_DATA[EXISTING_TOKENINXV].OBJECT_REFERENCE EQL
             REFERENCE TO OBJECT) THEN
          BEGIN
             TOKENV.TOKEN_REUSECOUNTF :=
               TOKEN_DATA[EXISTING_TOKENINXV].REUSE_COUNT;
             TOKENV.TOKEN_INXF := EXISTING_TOKENINXV;
          END ELSE
409       BEGIN
             GET_TOKENV := TOKEN_BADOBJECT;
          END;
          UNLOCK(TOKEN_DATA[EXISTING_TOKENINXV].LOCK);
410       TOKEN_RETURNTOKEN(TOKENINXV);
          IF GET_TOKENV EQL TOKEN_ALREADYDONE THEN
             TOKEN := TOKENV;
       END ELSE
       BEGIN
          TOKEN_RETURNTOKEN(TOKENINXV);
       END;
    END;
```

Figure 4

```
            INTEGER PROCEDURE
OPERATION_VIA_TOKEN(TOKEN,OPERATION_PARAMETERS);
            BEGIN
               INTEGER
                  TOKENINXV;

TOKENINXV := TOKEN.TOKEN_INXF;
               IF TOKENINXV LSS 1 OR
                  TOKENINXV GEQ SIZE(TOKEN_DATA) THEN
      420      BEGIN
                  OPERATION_VIA_TOKEN := TOKEN_TOKENINVALID;
               END ELSE
               BEGIN
           421 LOCK(TOKEN_DATA[TOKENINXV].LOCK);
                  IF (NOT TOKEN_DATA[TOKENINXV].VALID) OR
                     (TOKEN_DATA[TOKENINXV].REUSE_COUNT NEQ
                      TOKEN.TOKEN_REUSECOUNTF) THEN
      422         BEGIN
                     OPERATION_VIA_TOKEN := TOKEN_TOKENINVALID;
                  END ELSE
                  BEGIN
                     < perform operation on
      423            TOKEN_DATA[TOKENINXV].OBJECT_REFERENCE,
                     using OPERATION_PARAMETERS >
                     OPERATION_VIA_TOKEN := TOKEN_SUCCESS;
                  END;
           424 UNLOCK(TOKEN_DATA[TOKENINXV].LOCK);
               END;
            END OPERATION_VIA_TOKEN;
```

Figure 5

```
                    INTEGER PROCEDURE RETURN_TOKEN(REFERENCE TO
OBJECT);
            BEGIN
                INTEGER
                    RETURN_TOKENV,
                    TOKENINXV;

430  TOKENINXV := OBJECT.TOKENINX;
                    IF TOKENINXV EQL 0 THEN
                    BEGIN
                        % This assumes that OBJECT was allocated with TOKENINX
                        % set to zero.
                        RETURN_TOKENV := TOKEN_NOTOKEN;
                    END ELSE
                    BEGIN
                      431 LOCK(TOKEN_DATA[TOKENINXV].LOCK);
                        ┌─IF TOKEN_DATA[TOKENINXV].VALID CAND
                        │      (TOKEN_DATA[TOKENINXV].OBJECT_REFERENCE
    EQL                 │
                   432  │      REFERENCE TO OBJECT) THEN
                        │   BEGIN
                        │      TOKEN_DATA[TOKENINXV].VALID := FALSE;
                        │      TOKEN_DATA[TOKENINXV].OBJECT_REFERENCE :=
     0;                 │
                        │      OBJECT.TOKENINX := 0;
                        └──    RETURN_TOKENV := TOKEN_SUCCESS;
                           END ELSE
                           BEGIN
                               RETURN_TOKENV := TOKEN_NOTOKEN;
                           END;
                      433 UNLOCK(TOKEN_DATA[TOKENINXV].LOCK);
                      434 IF RETURN_TOKENV EQL TOKEN_SUCCESS THEN
                              TOKEN_RETURNTOKEN(TOKENINXV);
                        END;
                    END;
                435 RETURN_TOKEN := RETURN_TOKENV;
            END RETURN_TOKEN;
```

Figure 6

```
                                    700
              INTEGER PROCEDURE TOKEN_GETTOKEN;
              BEGIN
     440          LOCK(TOKEN_AVAILLOCK);
                  IF TOKEN_AVAILHEAD EQL 0 AND
                      SIZE(TOKEN_DATA) LSS TOKEN_MAXTOKENS THEN
                  BEGIN
     441              % TOKEN_MAXTOKENS is one more than the largest value
which
                      % will fit in TOKEN_INXF and in TOKENINX of OBJECT,
assuming
                      % that TOKEN_DATA is indexed origin zero.
                      <Expand TOKEN_DATA, initializing new entries with
                      LOCK free, VALID false, and REUSE_COUNT zero>
                      <link new entries to avail list>
                  END;
                  IF TOKEN_AVAILHEAD NEQ 0 THEN
     442          BEGIN
                      <De-link and return head of avail list>
                  END ELSE
                  BEGIN
                      TOKEN_GETTOKEN := 0;
                  END;
     443          UNLOCK(TOKEN_AVAILLOCK);
              END TOKEN_GETTOKEN;
                                                        701
              PROCEDURE TOKEN_RETURNTOKEN(TOKENINXV);
              VALUE   TOKENINXV;
              INTEGER TOKENINXV;
              BEGIN
                  IF TOKEN_DATA[TOKENINXV].REUSE_COUNT LSS
         TOKEN_REUSECOUNTMAX THEN
                  BEGIN
                      % TOKEN_REUSECOUNTMAX is the largest value which will
     450 fit in
                      % TOKEN_REUSECOUNTF and in REUSE_COUNT of
         TOKEN_DATA.
                      LOCK(TOKEN_AVAILLOCK);
                      <link to avail list>
                      UNLOCK(TOKEN_AVAILLOCK);
                  END;
              END TOKEN_RETURNTOKEN;
```

Figure 7

SYSTEM AND METHOD FOR USING ANONYMOUS TOKENS FOR EFFICIENT MEMORY MANAGEMENT

FIELD OF THE INVENTION

This invention relates to the field of computer programming and more particularly to managing objects and pointers, references or handles to objects.

BACKGROUND

It is often necessary to have pointers, references and/or handles which locate and identify an object stored in memory. When the object is no longer needed, it would be preferable to be able to make the memory used to store the object available for reuse. In order for the memory to be available for reuse, it is typically necessary to insure that existing pointers, references and/or handles to the object are de-allocated, invalidated or otherwise modified so that they can no longer be used to access the memory location formerly occupied by the object. Current mechanisms available to address this memory management problem are complex, resource consuming and error-prone. One such mechanism employs a handle as described below.

A handle is a temporary name or number assigned to an object or file. For example, an operating system may assign a (typically sequential) number to each file that the operating system opens, as a way of identifying the file. A typical way to implement a handle to aid in managing objects is illustrated in FIGS. 1 and 2. FIG. 1 depicts an exemplary computing environment 10 including a computing device 5 comprising a central processing unit 22 and memory 24. Memory 24 may be any kind of volatile memory. As shown in FIG. 2, a handle 102 is associated with an index into a pointer array 104. Pointer array 104 comprises a series of entries 106, 108, 110 . . . n, to which handle 102 may point. In FIG. 2, handle 102 points to the fourth entry 112 in pointer array 104. The fourth entry 112 typically contains a pointer to an object, such as object 114. After object 114 is de-allocated, the pointer in pointer array 104 entry 112 will point to the location in memory formerly occupied by object 114 or to the location in memory occupied by a new object or to a location in memory not occupied by any object (often location zero), causing obvious problems. To prevent these problems, it is desirable to somehow locate and modify all pointers, including any copies that may exist, that point to the de-allocated object 114. This process frequently requires a significant expenditure of system resources.

There are other well-known techniques to address the memory management problem. For example, one approach is to structure the programs to prevent copying pointers, references or handles when the objects pointed to may not exist as long as the pointers, references or handles do. Minimal overhead is associated with this option but it is often not possible or not convenient to structure programs this way.

Another known technique is to keep a linked list of the pointers, references or handles and update the linked list whenever an object pointed to by an element of the linked list is de-allocated. A linked list contains at least a pointer to the next item in the list and frequently contains a pointer to the previous item in the list as well. Use of a linked list requires the use of a data structure containing an element for the storage of the pointer to the next item in the list ("next pointer") and an element for the storage of the pointer to the previous item in the list ("previous pointer"), thus a linked list has increased space requirements. Furthermore, all code associated with the linked list must update the linked list properly, including updating the "next" and (when employed) the "previous" pointers, whenever additions or deletions to the list occur, creating added programming overhead. If multiple programs update the linked list, the linked list must be locked so that two processes do not update the list at the same time. When the object pointed to is deallocated, all the pointers, references or handles must be searched for, found and updated. Alternatively, the object could remain in memory indefinitely (until reboot) and/or be marked invalid so that subsequent access of the object is prevented. This technique would not permit the memory used to store the object to be reused and thus would require that the amount of memory available between re-boots would be adequate to store all the objects instantiated between re-boots.

Another known technique would involve keeping track of objects that are no longer in use, but not immediately making the memory location of the object available for re-use. The memory location would remain unavailable until some period of time elapsed or until some trigger condition occurred (such as available memory is running low) at which time a single search could be used to find and invalidate all the pointers, references, or handles to all those objects.

Accordingly, a primary goal of the present invention is to provide a mechanism for referencing objects that imposes minimal or no restrictions on where the references may be stored. A further goal of the present invention is to provide a mechanism that imposes little or no extra overhead when copying the object references, and that enables the object associated with the reference to be de-allocated and its memory immediately made available for reuse, without a need to search for the copies of the references or to modify the copies, and that involves little extra overhead upon object deallocation.

SUMMARY OF THE INVENTION

The present invention provides a mechanism which eliminates the need to search for pointers to de-allocated objects. In one embodiment of the present invention an anonymous token includes an anonymous token reuse count and an anonymous token value (handle) assigned to an object to identify and locate the object in memory. It is presently contemplated that the anonymous token will not be reused between system boots, and that the anonymous token value will be used as an index into an array of token data entries. In a presently preferred embodiment of the invention, a token data array entry includes a token data array entry reuse count, a token data array entry lock, a token data array entry validity indicator and a token data array entry reference to an object (object reference). Illustrative uses of an anonymous token in accordance with the present invention are described below, as are other aspects of the present invention.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4 depicts pseudocode describing the assignment of an anonymous token value to an object in accordance with one embodiment of the invention;

FIG. 5 depicts pseudocode describing an operation associated with an object associated with an anonymous token value in accordance with one embodiment of the invention;

FIG. 6 depicts pseudocode describing the de-allocation of an object associated with an anonymous token value in accordance with one embodiment of the invention; and FIG. 7 depicts pseudocode describing the management of an available list of anonymous token values in accordance with one embodiment of the invention.

DETAILED DESCRIPTION OF PREFERRED EMBODIMENTS

Overview

Figure 1:
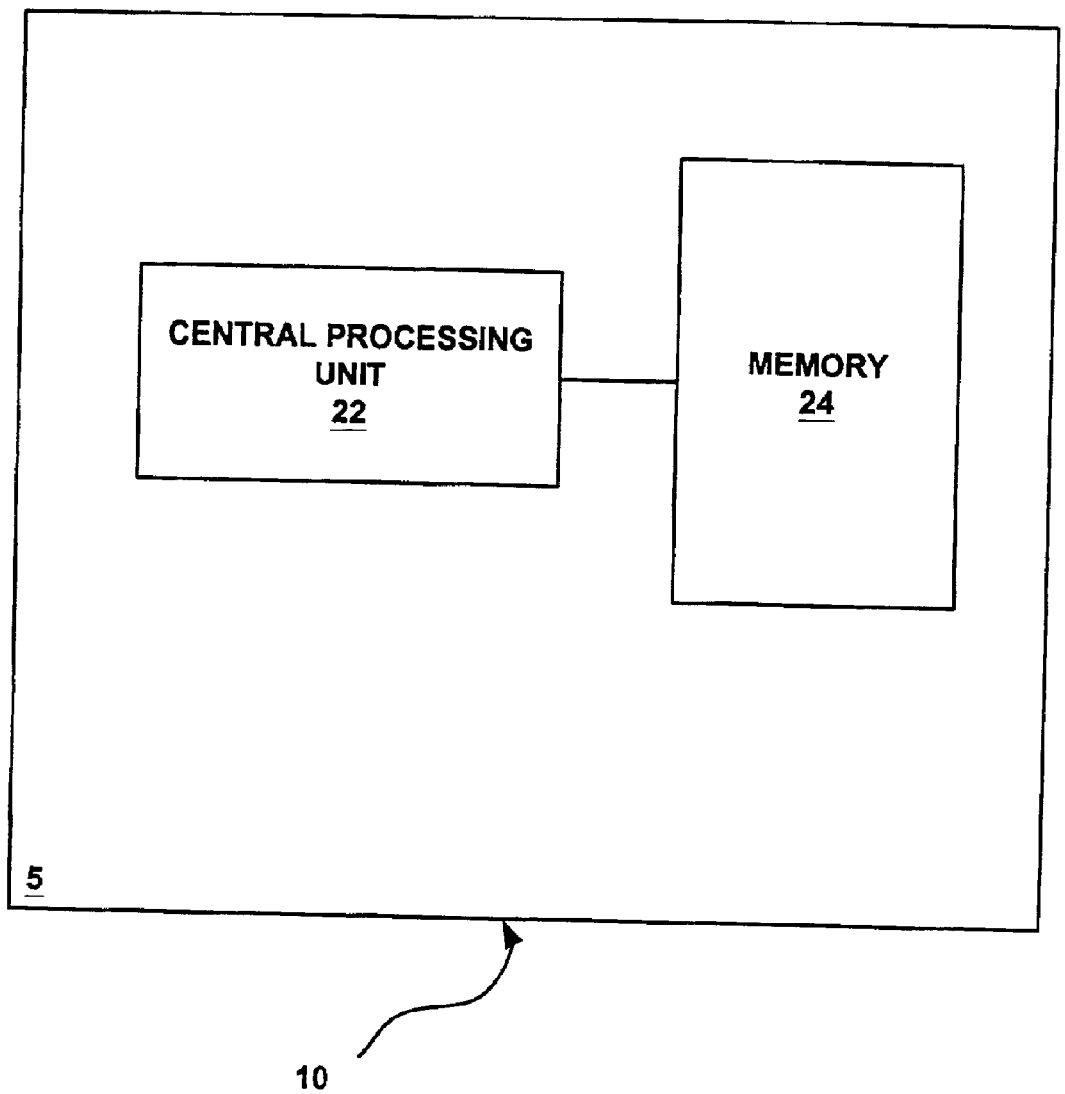
FIG. 1 is a block diagram showing an exemplary computing environment in which aspects of the invention may be implemented.
Figure 2:
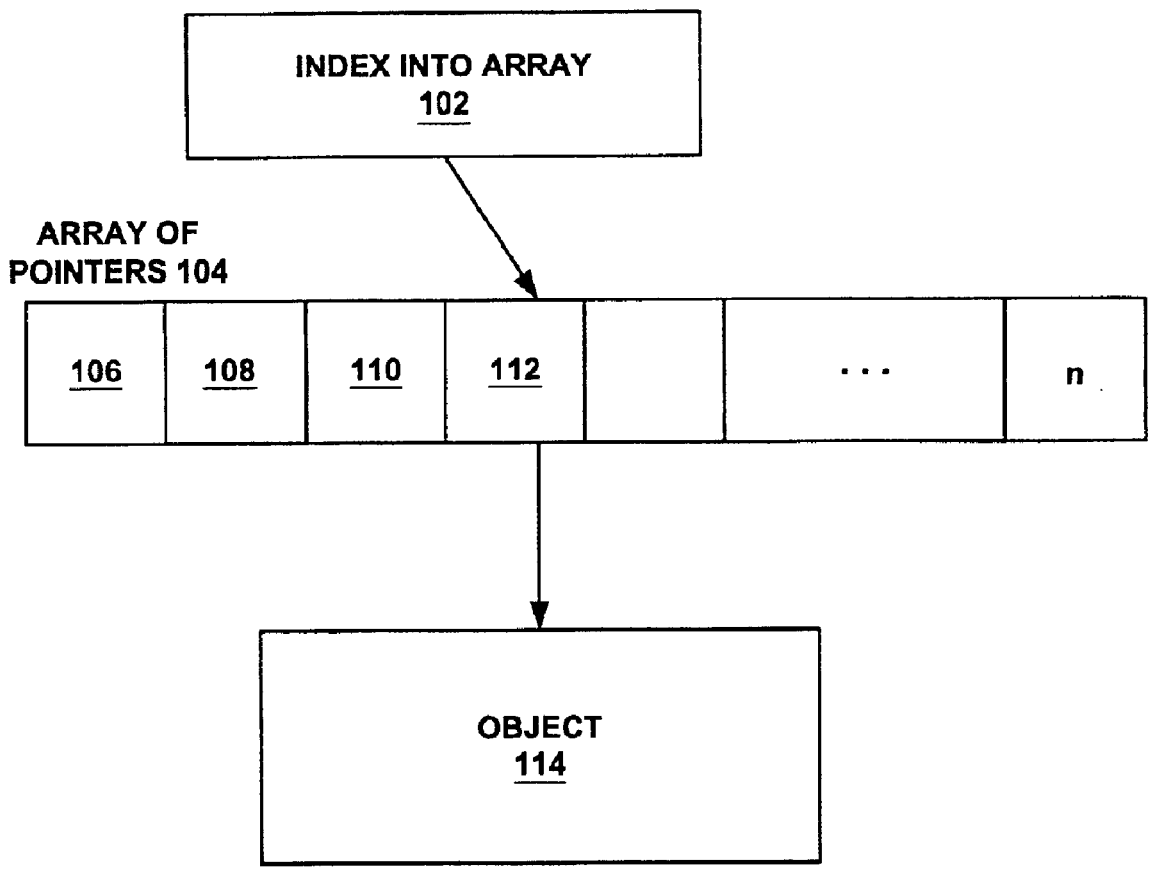
FIG. 2 illustrates the way a typical handle may be used to locate objects in memory as is known in the art.

As discussed above, the present invention provides an anonymous token for use in managing transient objects. The use of the anonymous token eliminates the need to search for pointers, references or handles to an object remaining in memory after the object directly or indirectly pointed to is deallocated. In a presently preferred implementation, an anonymous token includes an anonymous token "reuse count" and an anonymous token "value", which acts as a handle. The value is assigned to an object to identify and locate the object in memory. A data structure such as, but not limited to, an array, may be used to store data elements associated with the object identified by the token. Data elements associated with the object in a presently preferred implementation include a "lock," a "reuse count," an "object reference," and a "validity indicator."

When an anonymous token is needed for an object, a token value is obtained from a list of available anonymous token values, and the anonymous token value assigned to the object is removed from the list of available token values. In addition, the object is assigned the anonymous token value. For example, the anonymous token value may be stored in a data element (object anonymous token value) associated with the object by appending the object anonymous token value to the object. Alternately the object may be linked to the object anonymous token value via a database or by other suitable methods. In addition, the data elements of the token data array entry associated with the anonymous token value are updated: the token data array entry validity indicator is set to indicate validity, the token data array entry reuse count is incremented by one, and the token data array entry object reference is set to the location of the object in memory. In addition, the anonymous token reuse count is set to the token data array entry reuse count.

By way of further explanation of how an anonymous token may be employed, consider what happens when an operation is performed on an object identified by an anonymous token. In an exemplary implementation of the present invention, the anonymous token reuse count is compared to the token data array entry reuse count of the data array entry associated with the anonymous token value of the object. The operation will not be performed if the reuse counts are not identical or if the token data array entry validity indicator of the data array entry associated with the object does not indicate validity. Moreover, when an object associated with an anonymous token is de-allocated, the token data array entry validity indicator is set to indicate invalidity, the token data array entry object reference is set to zero or to some value indicating that no object is associated with the token data array entry, thus orphaning the anonymous token. Any subsequent attempt to access an object via an orphaned anonymous token will be rejected because the anonymous token reuse count will not match the token data array entry reuse count and/or the token data array entry validity indicator will indicate invalidity. The anonymous token value is returned to the available list, unless the token data array entry reuse count has exceeded some specified maximum value.

Preferably, whenever a token data array entry is used or modified, the entry is locked to prevent another process from modifying the entry concurrently. The entry is unlocked after the entry is used or modified.

Thus, when an object is de-allocated, it is not necessary to search for, locate and modify all the copies of the handles. As soon as an object is deallocated, the anonymous token reuse count and the token data array entry reuse count associated with the object will no longer agree and/or the token data array entry validity indicator will indicate invalidity and the de-allocated object will not be accessible by the anonymous token. When a reuse count has reached some configurable maximum the anonymous token value is retired by removing the anonymous token value from the available token list.

We will now explain in greater detail the presently preferred structure and use of anonymous tokens in accordance with the present invention.

Anonymous Tokens

A mechanism is disclosed that overcomes the drawbacks of the prior art. In one embodiment of the invention, an anonymous token is created that includes a value used as a handle to an object. The anonymous token also includes a reuse count that is used to determine if the location in memory pointed to, is still occupied by the object associated with the handle. The anonymous token value is also associated with an entry in a token data array. The token data array may include a number of entries, up to some configured maximum number. Each entry in the token data array includes a number of data elements, preferably including a lock element, a reuse count element, an object reference and a validity indicator. The object reference of the token data array entry contains a pointer or reference to the object identified by the anonymous token value. A data element associated with the object contains the anonymous token value associated with the object.

In one embodiment the anonymous token is comprised of 48-bits, wherein none of the 48-bit values will be reused until the system is rebooted. Up to $2^{20}$ anonymous token values can be valid at any one point in time. When an object associated with an anonymous token is de-allocated, the token data array entry data for the token associated with the object will be invalidated, orphaning the 48-bit anonymous token. Thereafter, any attempt to access a de-allocated object via an orphaned anonymous token will be rejected without ever having to search for the tokens. Locking insures that only one process at a time updates the central data for the token.

Figure 3:
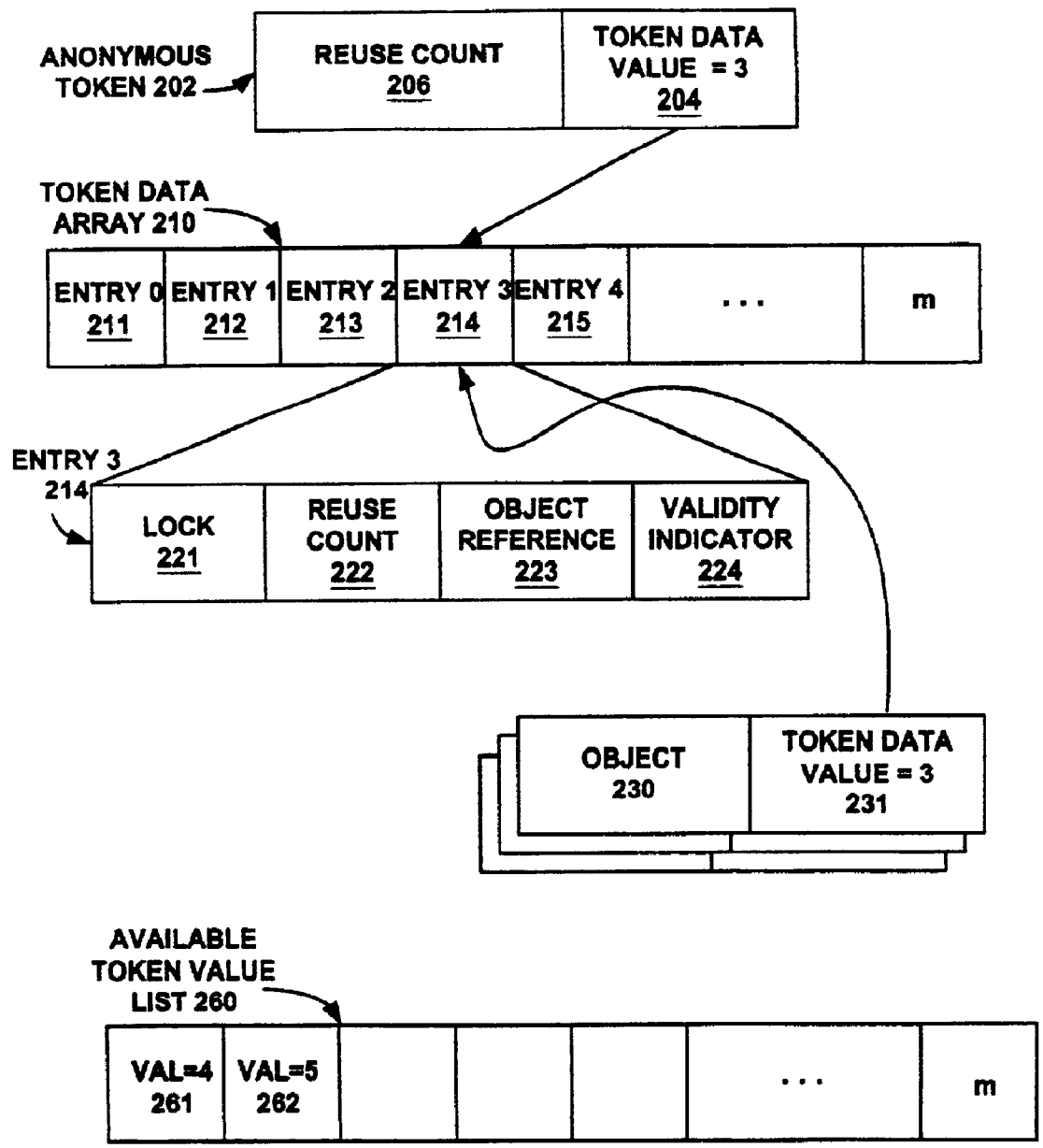
FIG. 3 illustrates the way a handle in accordance with one embodiment of the invention may be used to locate and manage pointers, references or handles to objects in memory.

FIG. 3 illustrates a mechanism for managing pointers, references and handles to objects in accordance with the present invention. An anonymous token 202 comprises two integer fields, anonymous token value 204 and reuse count 206. Token value 204 contains a number corresponding to an entry in token data array 210. In exemplary FIG. 3 token data value 204 equals three, that is anonymous token 202 is associated with entry 3 214 of token data array 210. Token data array 210 contains a number of entries, 211, 212, 213, 214, 215 . . . m, where m is some maximum number of entries that can be stored in token data array 210. In one embodiment of the invention m is $2^{20}$, but m could be any suitable number.

In one embodiment token data array 210 contains an "entry 0" 211 associated with token data value=zero, an "entry 1" 212 associated with token data value=one and so on up to maximum entry number m. Each entry 211, 212 . . . m of token data array 210 contains a data array lock (e.g., lock 221 for entry 3 214), a token data array reuse count (e.g., reuse count 222 for entry 3 214), a token data object reference (e.g., object reference 223 for entry 3 214) and a token data validity indicator (e.g., validity indicator 224 for entry 3 214). Token data object reference 223 may point to object 230. Object 230 may be associated with data element object token data value 231.

Anonymous token 202, token data array 210 and object 230 may be stored anywhere in the volatile memory 24 of a computer system 10 (FIG. 1). Preferably the anonymous tokens generated by the anonymous token algorithms cannot be changed by software other than the anonymous token software. Preferably anonymous tokens cannot be forged by software other than the anonymous token software. Preferably use of the anonymous tokens application programming interfaces (APIs) are limited to trusted software. Alternately, use of the anonymous token API could be limited by employing well known hardware (e.g., memory tag) or software (e.g., compiler enforcement) data protection techniques to protect the anonymous tokens.

When an anonymous token (e.g., anonymous token 202) is valid, that is, the anonymous token (e.g., anonymous token 202) is associated with an object (e.g., object 230), the reuse count field of the anonymous token will match the reuse count field of the corresponding token data array entry. It is unnecessary to overwrite or change an obsolete anonymous token, because the reuse count mechanism catches and rejects any attempt to use an obsolete anonymous token.

Hence a mechanism for managing objects in accordance with one embodiment of the present invention may comprise the following steps: 1.) assigning a anonymous token value to an allocated object 2.) updating data elements associated with the anonymous token value 3.) before allowing the object associated with the anonymous token to be accessed via the anonymous token, requiring that the anonymous token reuse count and the token data array reuse count match and 4.) when an object is de-allocated, modifying the token data array validity indicator of the entry associated with the de-allocated object, modifying the token data array object reference of the entry associated with the de-allocated object and returning the anonymous token value associated with the de-allocated object to the available list. Preferably, before the anonymous token value is returned to the available list, the token data array reuse count is checked to see if it has exceeded a configurable maximum value. If the reuse count has exceed the maximum allowable value, the anonymous token value is not returned to the available list.
Assigning an Anonymous Token to an Allocated Object Generally, an object capable of being identified by an anonymous token may also have other means of identification. In one embodiment of the invention, an anonymous token mechanism adds anonymous token identification to an object which is already allocated and which already may have another means of identification. In the pseudo code of FIGS. 4–7, the object reference passed to a procedure such as exemplary procedure GET_TOKEN of FIG. 4 is intended to represent such a means of identifying the object.

Preferably, entry 0 211 of token data array 210 is not used to contain token data for an object such as object 230. An object 230 capable of being identified by an anonymous token 202 preferably is associated with an object token data value 231 which may be used to store a value that is used as an index into token data array 210. When an object such as object 230 is allocated, (before it is associated with an anonymous token 202), object token data value 231 is preferably set to zero, indicating that object 230 has not yet been assigned an anonymous token 202.

FIG. 4 illustrates a pseudo-code routine that adds anonymous token identification to an allocated object such as exemplary object 230. At step 401, a procedure finds and returns a free entry in token data array 210, by calling a procedure such as TOKEN_GETTOKEN.

A list 260 (FIG. 3) of available anonymous token values 261, 262 . . . m, where m is some maximum number of tokens, is maintained. A procedure such as TOKEN_GETTOKEN determines a free entry in the token data array by accessing the available token values list 260.

Every time an anonymous token is used to identify and locate an object, the reuse count of the token data array entry associated with the object is incremented. That token data array entry reuse count is then copied to the reuse count of the anonymous token associated with the object. When the token data array reuse count reaches some configurable maximum number, the token data array entry is retired. For example, if the maximum value for reuse count is 10, and the value of entry 3 214 reuse count 222 has reached 10, when the object 230 associated with entry 3 214 is de-allocated, anonymous token 202 token data value=3 is not returned to a list of available token values 260.

Furthermore, if the number of entries in the available token values list 260 is reduced to zero, an error condition will occur. Therefore the maximum anonymous token value m preferably should be at least large enough to allow simultaneous allocation of as many objects (and thus anonymous token values) as will ever be in simultaneous use during the time between boots. Preferably the maximum value of the reuse count field is large enough so that only a small number of entries 211, 212 . . . m in token data array 210 will be retired during the time period bounded by two re-boots, assuming the highest reasonable rate of anonymous token allocation and the longest reasonable time period bounded by two re-boots.

Assume that procedure TOKEN_GETTOKEN called in step 401 returns a value of "3".

At step 402, the value returned (3) is compared to zero. If the value returned is zero, token data array 210 is full and the procedure returns a value representing that a resource limit has been reached.

If the value of the cell returned is not zero, at step 403, the specified entry in token data array 210 is locked (e.g., entry 3 214 in token data array 210 is locked).

At step 404 the value contained in object 230's anonymous token value 231 is examined. If the value in object anonymous token value 231 is not zero, then object 230 has already been assigned an anonymous token. At step 404 the value in object anonymous token value 231 is determined. Assume the value associated with object 230 anonymous token value 231 is 2. If this is the case, at step 406 entry 3 214 in token data array 210 is unlocked. At step 408 entry 2 213 associated with anonymous token value 2 in token data array 210 is locked. If validity indicator (not shown) of token data array entry 2 213 indicates that entry 2 is valid, and the token data array entry 2 object reference (not shown) is the same as the object reference passed to the procedure for object 230, then an anonymous token with anonymous token value=2 is constructed, entry 2 213 is unlocked and entry 3 214 is returned to the available token values list 260 at step 410.

If, however, token data array 210 entry 2 213 validity indicator indicates that the entry is not valid, or the token data entry 2 object reference is not the same as the object reference to object 230 passed to the procedure, object 230 is no longer allocated and a "bad object" error is returned at step 409 and processing continues at step 410. At step 410 the token data array 210 entry 2 is unlocked and entry 3 214 is returned to the available token values list 260.

Assume now that the value of object 230 anonymous token value 231 is zero. If, at step 404, the value of object 230 anonymous token value 231 equals zero, object 230 has not been associated with an anonymous token. At step 405 token data array 210 entry 3 214 reuse count 222 is incremented by one and token data array 210 entry 3 214 object reference 223 is set to the object reference provided to the procedure, and token data array 210 entry 3 214 validity indicator 224 is set to indicate validity. An anonymous token 202 reuse count 206 is set to token data array 210 entry 3 214 reuse count 222 and anonymous token 202 token data value 204 is set to "3". Object 230 anonymous token value 231 is set to 3. A variable that is used to indicate whether or not a token has been successfully associated with an object is set to indicate success. At step 406 token data array 210 entry 3 214 is unlocked. At step 407, the anonymous token constructed in step 405 is returned.

Performing an Operation on an Object Associated with an Anonymous Token

FIG. 5 illustrates a pseudo-code routine that performs an operation on an object such as object 230, object 230 being identified by way of an anonymous token 202. In one embodiment, a routine could be written for every combination of object type and operation to be supported via the anonymous token mechanism. Alternately, multiple object types and/or multiple operations could be supported by a single routine.

At step 420, the anonymous token 202 anonymous token value 204 is validated to see if anonymous token value 204 falls with a specified range of values. If it does not, the token is invalid. If anonymous token 202 is valid, at step 421 the token data array entry represented by anonymous token value 204 is locked. For example, assume that the value of anonymous token value 204 is 3, representing entry 3 214. In that case, token data array 210 entry 3 214 containing data elements lock 221, reuse count 222, object reference 223 and validity indicator 224 are locked at step 421. If validity indicator 224 does not indicate a valid entry or the reuse count 222 of entry 3 214 is not identical to anonymous token 202 reuse count 206, then token 202 is not valid and the operation is not performed. If validity indicator 224 is true and the reuse count 222 of entry 3 214 is identical to anonymous token 202 reuse count 206, token 202 is valid and the operation is performed at step 423. At step 424 the token data array 210 entry 3 214 is unlocked.

De-allocating an Object Identified by an Anonymous Token

FIG. 6 illustrates a pseudo-code routine that removes anonymous token identification from an allocated object. For every object type capable of having anonymous token identification, a de-allocation procedure preferably checks for validity of the object token data value and invokes a routine such as this before de-allocating the object. If an object, such as object 230 associated with an anonymous token such as anonymous token 202 is to be de-allocated, a procedure such as the procedure shown in FIG. 6 may be performed.

At step 430, the value in object 230 token data value 231 is retrieved, using the reference to object 230 passed to the procedure. Assume that object 230 token data value 231 is 3. At step 431 token data array 210 entry 3 214 is locked. At step 432, if token data array 210 entry 3 214 validity indicator 224 indicates validity and token data array 210 entry 3 214 object reference 223 is identical to the object reference passed to the procedure, token data array 210 entry 3 214 validity indicator 224 is set to indicate invalidity and token data array 210 entry 3 214 object reference 223 is set to 0. At step 433 entry 3 214 is unlocked. At step 434 the token return procedure is called. At step 435 the status of the return token operation is returned.

Managing a List of Available Token Values

FIG. 7 illustrates two pseudo-code routines 700 and 701 that manage the list of entries in an available token values list 260. Routine 700 returns a free entry in token data array 210 or allocates new anonymous token values, if a maximum token value has not been reached. At step 440, the list of available token values list 260 is locked. At step 441, if there are no available token values in available token values list 260, the number of entries in token data array 210 is examined to determine if token data array 210 has reached its maximum size. If token data array 210 has not reached its maximum size, token data array 210 is expanded, initializing new entries with token data array entry x lock set to free, validity indicator set to invalid, reuse count equal to zero and object reference equal to zero. The new entry or new entries are linked to the token available values list 260.

At step 442 if the list of available token values 260 contains entries, the next available free value is returned. At step 443 available token values list 260 is unlocked.

Procedure 701 of FIG. 7 illustrates a method in accordance with the invention for returning a value to the available token values list 260. An entry value 1, 2, 3 . . . m is retired by not linking the value to the available token values list 260. A anonymous token value is retired when the corresponding tokens data array entry reuse count reaches some maximum value, which in one embodiment is the limit imposed by the finite size of the containers in which reuse count is stored.

Assume that object 230 (FIG. 3) associated with token data value=3 231 has been de-allocated. At step 450 if token data array 210 entry 3 214 reuse count 222 is less than the designated maximum value mv, token data value "3" is linked to the available token values list 260. If token data array 210 entry 3 214 reuse count 222 in not less than the designated maximum value mv, token data value "3" is not linked to the available token values list 260 and entry 3 will not be used again to identify and locate an allocated object until reboot time, at which time reuse count 222 will be reset to zero.

Locking

In one embodiment of the present invention, the type of locking used is simple mutual exclusion locking, implemented by the operating system. When a thread or program locks a lock which is not already locked, the lock is marked as owned and the thread or program is permitted to proceed. When a thread or program locks a lock which is already locked, the operating system blocks its execution until the owning thread or program unlocks the lock and the blocked thread or program is granted ownership. Such a lock is often called a MUTEX. Other locking mechanisms are contemplated by the invention.

CONCLUSION

The programming necessary to effectuate the processes performed in connection with the present invention is relatively straight-forward and should be apparent to the relevant programming public. Any particular programming language or methodogies may be employed to effectuate the present invention without departing from the spirit and scope thereof.

In the foregoing description, it can be seen that the present invention comprises a new and useful mechanism for managing objects. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method for providing efficient access to an object in a computer system, the method comprising:
    associating an identifier with an allocated object, wherein the identifier is associated with a first reuse count, and wherein the first reuse count is incremented when the identifier is used to access the object;
    in response to a request to access the object:
        comparing the first reuse count to a second reuse count, wherein the second reuse count is incremented when the identifier is used to access the object;
        denying access to the object if the first reuse count does not match the second reuse count;
        checking a validity indicator with at least two possible states comprising valid and invalid; and
        denying access to the object if the validity indicator is in the invalid state.

2. The method of claim 1, wherein an entry associated with the identifier comprises a lock, the second reuse count, the validity indicator and an object reference.

3. The method of claim 2, wherein the entry is locked before accessing the entry and unlocked after accessing the entry.

4. The method of claim 2, further comprising in response to de-allocation of the object, setting the validity indicator associated with the identifier to indicate invalidity, and setting the object reference associated with the identifier to zero.

5. The method of claim 4, further comprising setting an object value associated with the object to zero.

6. The method of claim 4, further comprising in response to determining that second reuse count is less than a predetermined maximum value, placing the identifier on a list of available identifiers.

7. The method of claim 6, wherein the predetermined maximum value is determined by a size of a container in which the identifier is stored.

8. The method of claim 6, wherein the predetermined maximum value is greater than a total number of objects allocated between reboots.

9. The method of claim 1, wherein associating the object with the identifier further comprises:
    retrieving the identifier from a list of available identifiers;
    receiving a location in memory associated with the object;
    setting the validity indictor associated with the identifier to indicate validity, setting an object reference associated with the identifier to the location in memory associated with the object, incrementing the second reuse count by a predefined value, setting the first reuse count to the second reuse count and setting an object value associated with the object to the identifier.

10. The method of claim 1, wherein determining that the object is deallocated comprises at least one of:
    determining that the first reuse count is not equal to the second reuse count; and
    determining that the validity indicator indicates invalidity.

11. The method of claim 2, wherein the entry is stored in an array, wherein the array entry is indexed by the identifier.

12. A method for managing an allocated object in a computer system, comprising:
    providing a list of available values;
    providing a token comprising a value selected from the list and a first reuse count;
    providing a data array comprising an entry corresponding to the selected value, wherein the entry includes a validity indicator, the value of which is definable to indicate whether an object associated with the entry is valid and wherein the entry includes a second reuse count;
    assigning the value to the allocated object;
    in response to a request to perform an operation on the object, checking the validity indicator to determine whether the object is valid, determining if the first reuse count is equal to the second reuse count and permitting the operation to occur if the object is valid and the first reuse count is equal to the second reuse count.

13. The method of claim 12, wherein the entry also comprises an entry object reference, the value of which is definable to indicate where the object is located in memory.

14. The method of claim 13, further comprising:
    receiving a location at which the allocated object resides, and
    setting the entry object reference to the location at which the allocated object resides.

15. A method for managing a de-allocated object in a computer system, comprising:
    providing a location in memory associated with a de-allocated object, the de-allocated object associated with a token data value;
    determining the value associated with the de-allocated object;
    providing a data array comprising an entry corresponding to the value associated with the de-allocated object, wherein the entry includes a validity indicator, the value of which is definable to indicate whether an object associated with the entry is valid and wherein the entry includes an entry object reference, the value of which is definable to indicate where the object is located in memory;
    in response to determining that the location in memory associated with the de-allocated object matches the entry object reference and to determining that the object is valid, setting the validity indicator to indicate invalidity, and setting the entry object reference to zero.

16. The method of claim 15, further comprising in response to determining that the value associated with the de-allocated object is less than a predefined value, adding the value to a list of available values.

17. A computer system, comprising:
    a processing unit; and
    a memory including a data structure, the data structure comprising:
        a list of available values, wherein at least one value selected from the list is associated with a first reuse count and wherein the first reuse count is incremented when the value is used to access an object;
        a data array comprising an entry corresponding to the selected value, wherein the entry includes:

a validity indicator the state of which is definable to indicate whether an object associated with the entry is valid, a second reuse count wherein the second reuse count is incremented when the value is used to access an object; and an object reference.

18. The system of claim 17, wherein the object reference comprises a location in memory where an object associated with the entry is located.

19. The system of claim 17, wherein the entry further includes a lock.

20. The system of claim 17, wherein the memory further includes an object associated with the entry.

21. The system of claim 20, wherein the object associated with the entry is associated with the selected value by appending the value to the object associated with the entry.

* * * * *